J. McCABE.
BALL NUT LOCK.
APPLICATION FILED MAR. 1, 1918.
1,286,683.
Patented Dec. 3, 1918.
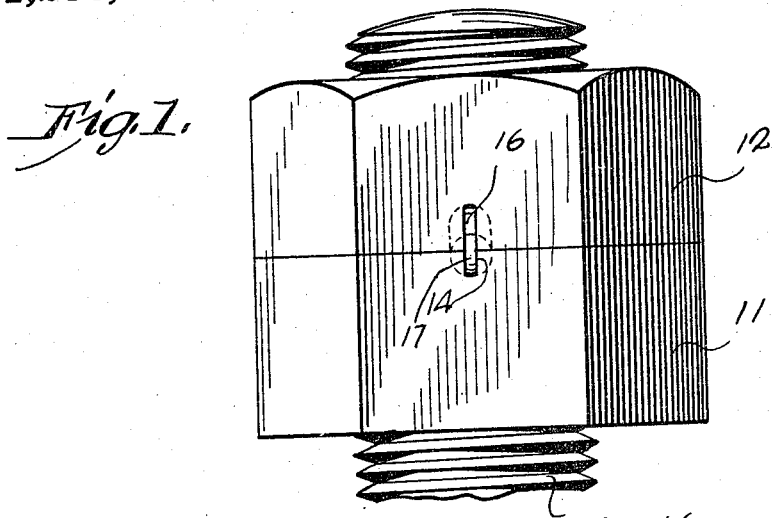
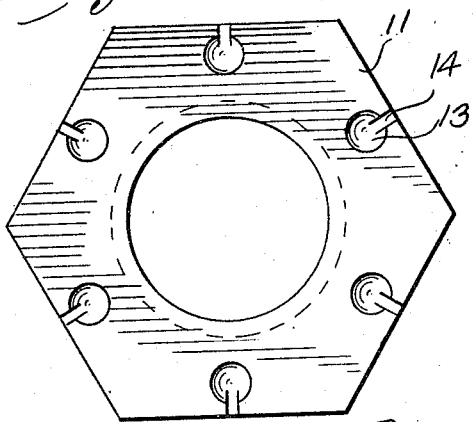
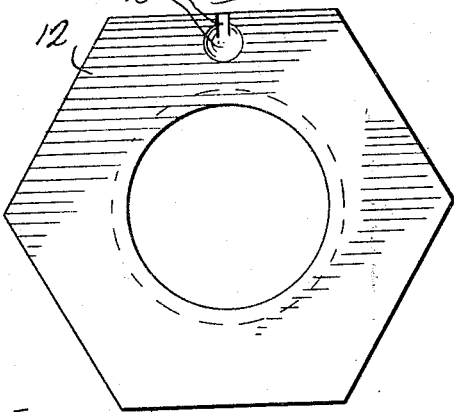
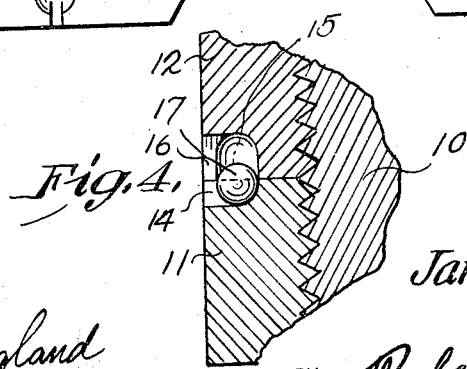
WITNESSES
R. W. Hoagland
INVENTOR
James McCabe,
BY Richard Owen
ATTORNEY

UNITED STATES PATENT OFFICE.

JAMES McCABE, OF JAMESTOWN, NORTH DAKOTA.

BALL NUT-LOCK.

1,286,683.  Specification of Letters Patent.  Patented Dec. 3, 1918.

Application filed March 1, 1918. Serial No. 219,823.

*To all whom it may concern:*

Be it known that I, JAMES McCABE, a citizen of the United States, residing at Jamestown, in the county of Stutsman and State of North Dakota, have invented certain new and useful Improvements in Ball Nut-Locks, of which the following is a specification.

This invention has relation to nut locks and has for an object to provide a device of this character including a nut for application to a threaded bolt of conventional type and provided with recesses and a jam nut for coaction with the first mentioned nut, likewise bearing recesses for registration with the first to receive a spherical locking member whereby to prevent relative rotation of the nuts.

Another object of the invention is to provide a nut lock including a nut and a jam nut for coaction therewith, said nuts having registering recesses in their meeting faces, one of said recesses being semi-spherical in configuration to receive a spherical locking member and the other recess of a depth to entirely receive the spherical member whereby the spherical member may be moved into one recess to lock the nuts together and moved into the other recess when the nuts are to be moved relatively to disengage the same from the bolt.

In addition to the foregoing my invention comprehends improvements in the details of construction and arrangement of the parts to be hereinafter more fully described and particularly set forth in the appended claim.

In the accompanying drawings in which similar and corresponding parts are designated by the same characters of reference throughout the several views in which they appear:—

Figure 1, is a view in side elevation of a nut lock constructed in accordance with my invention.

Fig. 2, is a face view of the binding nut.

Fig. 3, is a face view of the jam nut, and

Fig. 4, is a detail view in section illustrating the locking member in place.

With reference to the drawings 10 indicates the bolt of conventional type, 11 indicates the binding nut and 12 the jam nut. These nuts are to be applied in the order named to the bolt. The face of the binding nut 11 is designed for contact with the nut 12 and is formed with a plurality of semi-spherical recesses 13 located adjacent the sides of the nut. The nut is provided with slots or openings 14 which intersect the recesses 13 whereby an instrument may be inserted into the side of the nut for access into the interior of the recess 13 for a purpose which will be presently noted. In the present instance six of these semispherical recesses have been illustrated the same being located intermediate the ends of the faces of the nut which in the present instance is that of the hexagonal type. It will be obvious however that the number of recesses may be varied. The face of the jam nut 12 is designed for contact with the face of the nut 11, is provided with a single recess 15 designed for registration in the recesses 13 and is of a depth corresponding to the diameter of any one of the recesses 13. The recess 15 is similarly intersected by a slot 16 whereby an instrument may be inserted inside of the nut 12.

In use, the binding nut 11 is first applied to the bolt and tightened against the work. The face containing the recesses 13 must be disposed outwardly. The jam nut 12 is then applied to the bolt so that the face bearing the recess 15 may be adjacent the face of the nut 11 bearing the recesses 13 and the jam nut is turned up until the same is closely spaced from the nut 11. A spherical locking member 17 is then introduced between the nut and into the large recess 15 of the jam nut. The jam nut is then further rotated until tightened and until the recess 15 is brought opposite and into registration with one of the recesses 13. A pointed instrument is then inserted in the slot 16 of the jam nut and the locking member 17 engaged thereby to force said locking member into the semi-spherical recess 13. The jam nut 12 is then given a partial reverse rotation so as to bind the locking member between the two nuts which will effectively prevent relative rotation owing to the friction thus produced. Owing to the strain applied to the nuts tending to separate the same they will be tightened against the threads of the bolt to secure both nuts to the bolt. An effective locking action is then produced. To permit the nuts to be removed from the bolt it is but necessary to give the jam nut a partial revolution tending to loosen engagement upon the locking member so that the pointed instrument may be inserted in the slot 14 to again move the locking member 17 into the large recess 15 of the jam nut. The nuts may then be freely trained upon the bolt to permit their removal.

While I have illustrated and described my invention with some degree of particularity I realize that in practice various alterations thereover may be made and I therefore desire to reserve the right and privilege of changing the form of the details of construction or otherwise altering the arrangement of the correlative parts without departing from the spirit of the invention or the scope of the appended claim.

Having thus described my invention what I claim as new and desire to secure by Letters Patent is:—

A nut lock including the combination with a threaded bolt of a binding nut having a plurality of semi-circular recesses in one side face and slots intersecting said recesses, a jam nut for engagement with the binding nut and having a relatively deep recess in one side face for registration with any one of the shallower recesses, and having a slot intersecting said relatively deep recess, and a spherical locking member in said deep recess for introduction into any one of the shallower recesses when the nuts are brought into engagement subsequent to their application to the bolt to prevent relative movement thereof.

In testimony whereof I affix my signature in presence of two witnesses.

JAME McCABE.

Witnesses:
M. E. TWEED,
R. M. PERRY.

Copies of this patent may be obtained for five cents each, by addressing the "Commissioner of Patents, Washington, D. C."